United States Patent
Mills

(10) Patent No.: US 6,405,675 B1
(45) Date of Patent: Jun. 18, 2002

(54) WATER BOTTLE ASSEMBLY HAVING A REMOVABLE WATER BOWL

(76) Inventor: Julie M. Mills, 2804 NE. 155th Ave., Vancouver, WA (US) 98682

( * ) Notice: Subject to any disclaimer, the term of this patent is extended or adjusted under 35 U.S.C. 154(b) by 43 days.

(21) Appl. No.: 09/636,609

(22) Filed: Aug. 11, 2000

(51) Int. Cl.[7] ................................................. A01K 7/00
(52) U.S. Cl. ........................ 119/74; 119/51.5; 215/10; 215/DIG. 7
(58) Field of Search .................. 119/51.5, 74; 206/217, 206/514; 215/10, 387, 393, DIG. 7

(56) References Cited

U.S. PATENT DOCUMENTS

| D300,963 S | | 5/1989 | Atchley | |
|---|---|---|---|---|
| 4,984,723 A | * | 1/1991 | Hsu | ........................ 215/10 X |
| D321,572 S | | 11/1991 | Laden | |
| 5,301,829 A | * | 4/1994 | Chrisco | ..................... 215/10 X |
| D360,338 S | | 7/1995 | Westgerdes | |
| 5,577,647 A | * | 11/1996 | Pittarelli et al. | ........ 215/387 X |
| D397,531 S | | 8/1998 | Huff | |
| 5,809,935 A | | 9/1998 | Kolterman et al. | |
| D400,316 S | | 10/1998 | Kolterman et al. | |
| 6,079,361 A | * | 6/2000 | Bowell et al. | ............ 119/74 X |

* cited by examiner

Primary Examiner—Robert P. Swiatek

(57) ABSTRACT

A water bottle assembly having a removable water bowl for providing a receptacle for watering a pet while outdoors includes a bottle, a lid, and a bowl removably couplable to the water bottle for carrying the water bottle and bowl as a single unit. In an embodiment, the lid includes a spout assembly. In an embodiment, the bowl is coupled to the water bottle by frictional engagement to a strip of compressible material circumscribing an outer surface of the water bottle. In an embodiment, the upper edge of the water bottle extends from the outer surface of the water bottle for facilitating grasping of the bowl when removing the bowl from the water bottle.

8 Claims, 3 Drawing Sheets

WATER BOTTLE ASSEMBLY HAVING A REMOVABLE WATER BOWL

BACKGROUND OF THE INVENTION

1. Field of the Invention

The present invention relates to water bottles and more particularly pertains to a new water bottle assembly having a removable water bowl for providing a receptacle for watering a pet while outdoors.

2. Description of the Prior Art

The use of water bottles is known in the prior art. More specifically, water bottles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,809,935; U.S. Pat. No. Des. 400,316; U.S. Pat. No. Des. 360,338; U.S. Pat. No. Des. 300,963; U.S. Pat. No. Des. 397,531; and U.S. Pat. No. Des. 321,572.

While these devices fulfill their respective, particular objectives and requirements, the aforementioned patents do not disclose a new water bottle assembly having a removable water bowl. The inventive device includes a bottle, a lid, and a bowl removably couplable to the water bottle for carrying the water bottle and bowl as a single unit.

In these respects, the water bottle assembly having a removable water bowl according to the present invention substantially departs from the conventional concepts and designs of the prior art, and in so doing provides an apparatus primarily developed for the purpose of providing a receptacle for watering a pet while outdoors.

SUMMARY OF THE INVENTION

In view of the foregoing disadvantages inherent in the known types of water bottles now present in the prior art, the present invention provides a new water bottle assembly having a removable water bowl construction wherein the same can be utilized for providing a receptacle for watering a pet while outdoors.

The general purpose of the present invention, which will be described subsequently in greater detail, is to provide a new water bottle assembly having a removable water bowl apparatus and method which has many of the advantages of the water bottles mentioned heretofore and many novel features that result in a new water bottle assembly having a removable water bowl which is not anticipated, rendered obvious, suggested, or even implied by any of the prior art water bottles, either alone or in any combination thereof.

To attain this, the present invention generally comprises a bottle, a lid, and a bowl removably couplable to the water bottle for carrying the water bottle and bowl as a single unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water bottle assembly having a removable water bowl apparatus and method which has many of the advantages of the water bottles mentioned heretofore and many novel features that result in a new water bottle assembly having a removable water bowl which is not anticipated, rendered obvious, suggested, or even implied by any of the prior art water bottles, either alone or in any combination thereof.

It is another object of the present invention to provide a new water bottle assembly having a removable water bowl that may be easily and efficiently manufactured and marketed.

It is a further object of the present invention to provide a new water bottle assembly having a removable water bowl that is of a durable and reliable construction.

An even further object of the present invention is to provide a new water bottle assembly having a removable water bowl which is susceptible of a low cost of manufacture with regard to both materials and labor, and which accordingly is then susceptible of low prices of sale to the consuming public, thereby making such water bottle assembly having a removable water bowl economically available to the buying public.

Still yet another object of the present invention is to provide a new water bottle assembly having a removable water bowl which provides in the apparatuses and methods of the prior art some of the advantages thereof, while simultaneously overcoming some of the disadvantages normally associated therewith.

Still another object of the present invention is to provide a new water bottle assembly having a removable water bowl for providing a receptacle for watering a pet while outdoors.

Yet another object of the present invention is to provide a new water bottle assembly having a removable water bowl which includes a bottle, a lid, and a bowl removably couplable to the water bottle for carrying the water bottle and bowl as a single unit.

Still yet another object of the present invention is to provide a new water bottle assembly having a removable water bowl that provides a conveniently carried receptacle for facilitating feeding water to a pet while outdoors.

Even still another object of the present invention is to provide a new water bottle assembly having a removable water bowl that permits feeding fresh uncontaminated water to a pet in areas where natural water sources may be contaminated or where no receptacle is commonly provided in association with an uncontaminated water source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken along line 3—3 of FIG. 2.

DESCRIPTION OF THE PREFERRED EMBODIMENT

Figure 1:
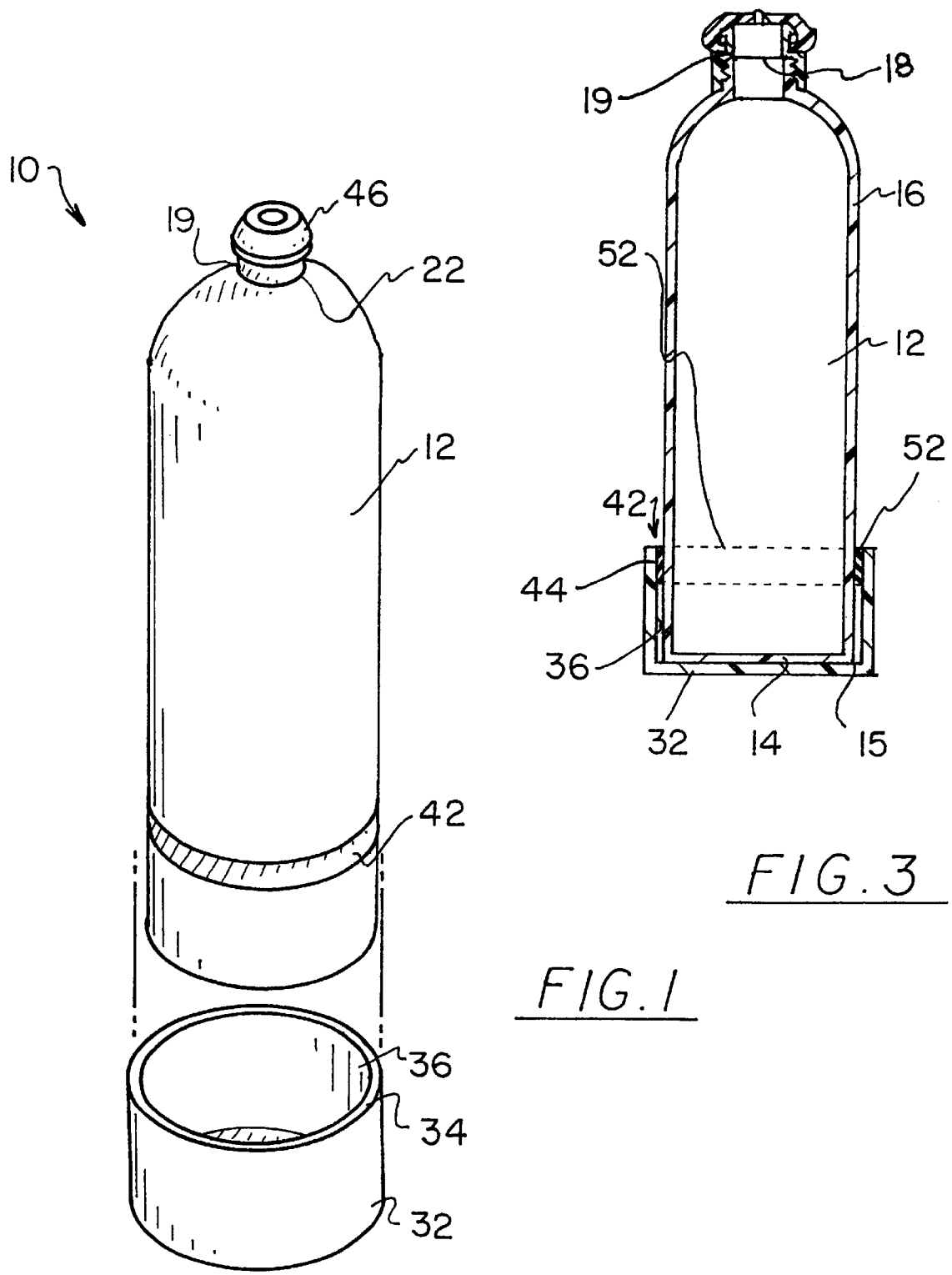
FIG. 1 is a perspective view of a new water bottle assembly having a removable water bowl according to the present invention.
Figure 2:
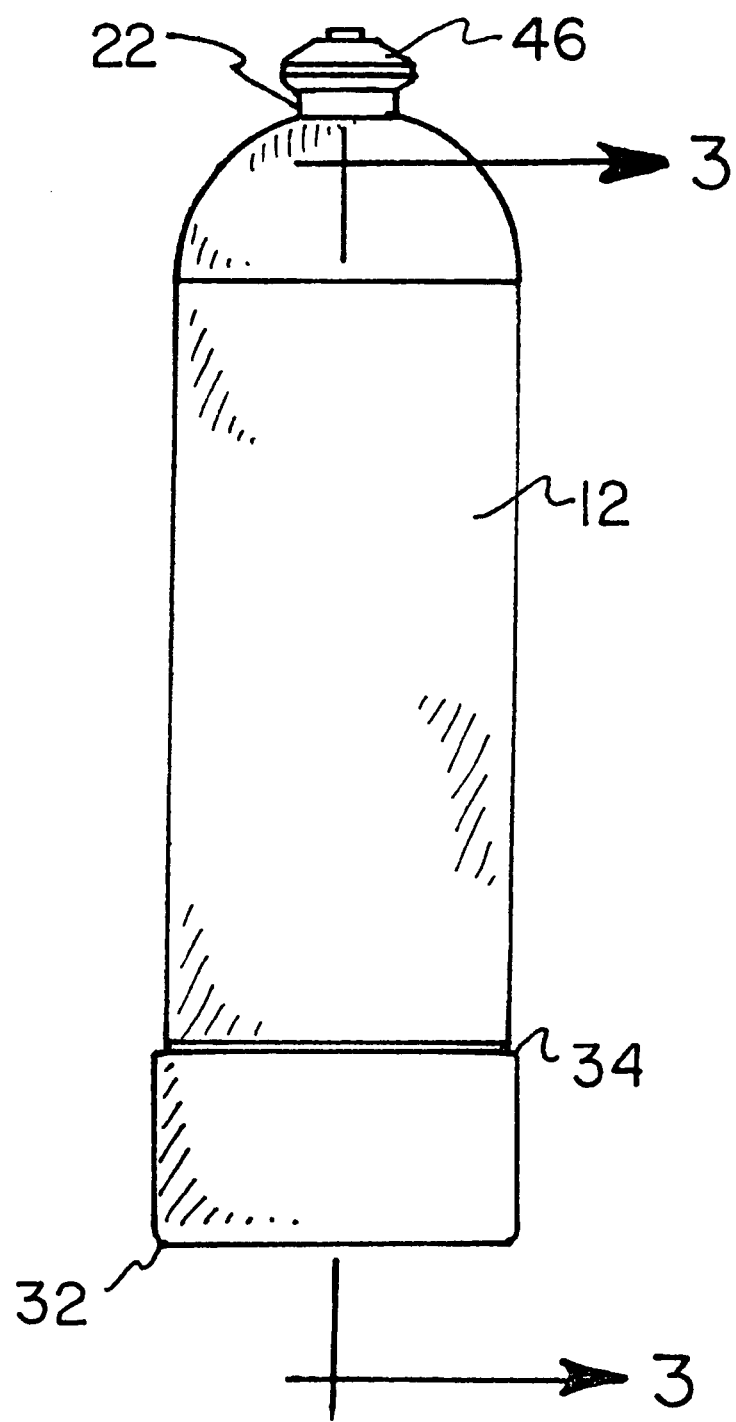
FIG. 2 is a side view of the present invention.
Figure 5:
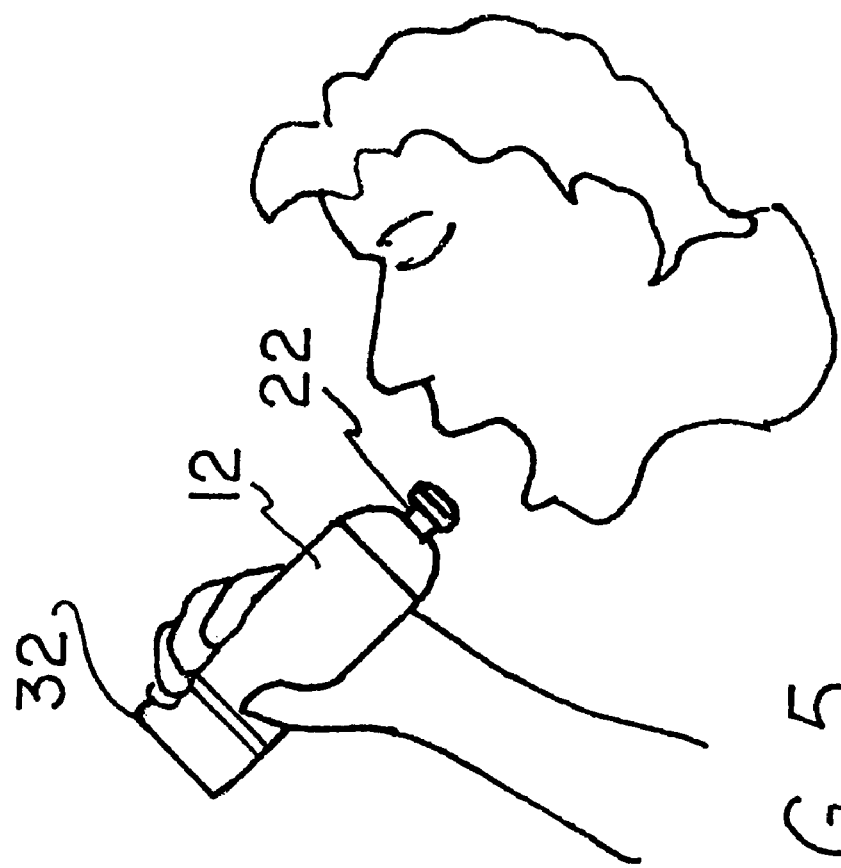
FIG. 5 is a side view of the present invention in use.
Figure 4:
FIG. 4 is a perspective view of the present invention in use.

With reference now to the drawings, and in particular to FIGS. 1 through 5 thereof, a new water bottle assembly having a removable water bowl embodying the principles and concepts of the present invention and generally designated by the reference numeral 10 will be described.

As best illustrated in FIGS. 1 through 5, the water bottle assembly 10 generally comprises a water bottle 12, a lid 22, and a bowl 32 couplable to the water bottle 12. The water bottle 12 includes a bottom 14, a perimeter side wall 16 extending outwardly from a perimeter edge 15 of the bottom 14, and a top opening 18 defined by an upper edge 19 of the perimeter side wall.

The lid 22 is attachable to the water bottle 12 to form a seal for covering the top opening 18 for preventing liquid from escaping the water bottle 12.

The bowl is removably couplable to the water bottle for transporting the bowl with the water bottle. The bowl 32 is removable from the water bottle to provide a receptacle for liquid in the water bottle for providing water to a pet. Alternately, a user may also drink directly from the bowl 32 if desired.

A compressible material 42 is coupled to the perimeter side wall 16 such that an outer surface 44 of the compressible material frictionally engages the bowl 32 when the bottom 14 of the water bottle 12 is inserted through an open end of the bowl 32. Thus the bowl 32 is designed to be removably coupled to the water bottle 12.

The lid 22 includes a spout assembly 46 designed for selectively dispensing a liquid contained in the water bottle, as commonly found on sport or hiking water bottles. The spout assembly 46 is selectively positionable between an open position and a closed position. The open position is defined by the spout assembly permitting dispensing of the liquid from the water bottle and the closed position is defined by the spout assembly being positioned to prevent water from being dispensed through the spout assembly.

The bowl 32 has an upper perimeter edge 34. The upper perimeter edge is positioned to extend outwardly from the perimeter side wall 16 of the water bottle 12 when the bowl 32 is coupled to the water bottle 12. Thus, the upper perimeter edge 34 of the bowl 32 is graspable by a user for facilitating uncoupling of the bowl 32 from the water bottle 12.

In an embodiment, the compressible material is an annular strip 52 circumscribing the perimeter side wall 16 of the water bottle for engaging a full circumferential length of an interior surface 36 of the bowl 32.

In use, the bowl 32 is frictionally engaged to the strip 52 for carrying the bowl 32 and water bottle 12 in one convenient unit. The bowl 32 is removed from the water bottle 12 by grasping the bowl 32 and pulling it from the water bottle 12. The upper perimeter edge 34 of the bowl 32 extends from the water bottle 12 to assist in removal of the bowl 32 from the water bottle 12. After removal of the bowl 32, the spout assembly 42 can be opened and liquid dispensed into the bowl 32 for a pet to drink.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bottle assembly comprising:

a bottle having a bottom, a perimeter side wall extending outwardly from a perimeter edge of said bottom, and a top opening defined by an upper edge of said perimeter side wall;

a lid couplable to said bottle for covering said top opening;

a bowl removably couplable to said bottle for transporting said bowl with said bottle; and a layer of compressible material coupled to said perimeter side wall such that an outer surface of said layer of compressible material frictionally engages said bowl when said bottom of said bottle is inserted through an open end of said bowl whereby said bowl is removably coupled to said bottle.

2. The bottle assembly of claim 1, further comprising:

said lid including a spout assembly such that said lid is adapted for selectively dispensing a liquid contained in said bottle through said spout assembly when said lid is coupled to said bottle.

3. The bottle assembly of claim 2, further comprising:

said spout assembly being selectively positionable between an open position and a closed position, said open position being defined by said spout assembly permitting dispensing of the liquid from said bottle, said closed position being defined by said spout assembly being positioned to prevent water from being dispensed through said spout assembly.

4. The bottle assembly of claim 1, further comprising:

said bowl having an upper perimeter edge, said upper perimeter edge being positioned to extend outwardly from said perimeter side wall of said bottle when said bowl is coupled to said bottle whereby said upper perimeter edge of said bowl is graspable by a user for facilitating uncoupling of said bowl from said bottle.

5. The bottle assembly of claim 1, further comprising:

said layer of compressible material being an annular strip and circumscribing said perimeter side wall of said bottle for engaging a full circumferential length of an interior surface of said bowl.

6. The bottle assembly of claim 1 wherein said compressible material is a rubber material.

7. The bottle assembly of claim 1 wherein said compressible material is a foam material.

8. A water bottle assembly for facilitating providing water to a pet while outdoors, the water bottle assembly comprising:

a bottle having a bottom, a perimeter side wall extending outwardly from a perimeter edge of said bottom, and a top opening defined by an upper edge of said perimeter side wall;

a lid couplable to said bottle for covering said top opening;

a bowl removably couplable to said bottle for transporting said bowl with said bottle;

a layer of compressible material coupled to said perimeter side wall such that an outer surface of said layer of compressible material frictionally engages said bowl when said bottom of said bottle is inserted through an open end of said bowl whereby said bowl is removably coupled to said bottle;

said lid including a spout assembly such that said lid is adapted for selectively dispensing a liquid contained in said bottle through said spout assembly when said lid is coupled to said bottle;

said spout assembly being selectively positionable between an open position and a closed position, said open position being defined by said spout assembly permitting dispensing of the liquid from said bottle, said closed position being defined by said spout assembly being positioned to prevent water from being dispensed through said spout assembly;

said bowl having an upper perimeter edge, said upper perimeter edge being positioned to extend outwardly from said perimeter side wall of said bottle when said bowl is coupled to said bottle whereby said upper perimeter edge of said bowl is graspable by a user for facilitating uncoupling of said bowl from said bottle;

said layer of compressible material being an annular strip and circumscribing said perimeter side wall of said bottle for engaging a full circumferential length of an interior surface of said bowl; and wherein said compressible material is a material selected from the group of materials consisting of rubber and foam.

* * * * *